(No Model.)
T. W. KING.
SHIELD FOR CULTIVATORS.
No. 596,660. Patented Jan. 4, 1898.
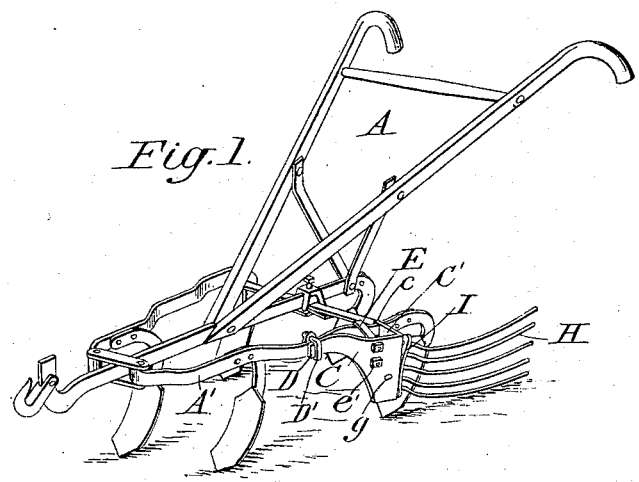
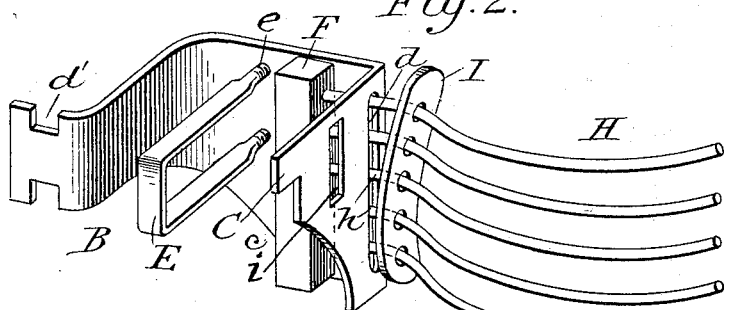
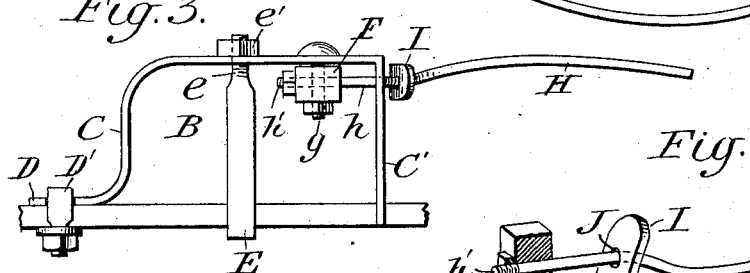
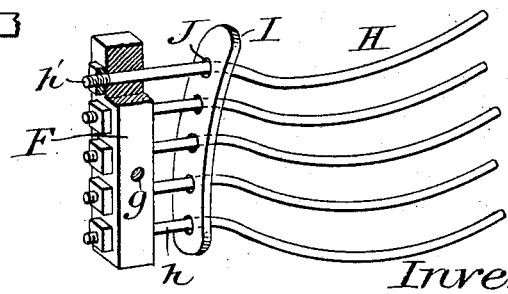
Witnesses:
A. J. Cory.
Alex Scott
Inventor
Thomas W. King

UNITED STATES PATENT OFFICE.

THOMAS W. KING, OF MARYLAND LINE, MARYLAND.

SHIELD FOR CULTIVATORS.

SPECIFICATION forming part of Letters Patent No. 596,660, dated January 4, 1898.

Application filed July 12, 1897. Serial No. 644,277. (No model.)

*To all whom it may concern:*

Be it known that I, THOMAS W. KING, of Maryland Line, in the county of Baltimore and State of Maryland, have invented certain new and useful Improvements in Shields for Cultivators; and I do hereby declare the following to be a full, clear, and exact description of the invention, such as will enable others skilled in the art to which it appertains to make and use the same.

My invention relates to certain new and useful improvements in shields for cultivators; and its object is to provide a novel form of device of this character to prevent stones and clods of earth from falling upon the plants, while readily permitting access of fine earth thereto.

With these and other objects in view the invention consists in certain novel constructions and combinations of parts hereinafter more fully described, and particularly pointed out in the appended claims.

In the accompanying drawings, Figure 1 is a perspective view of a cultivator embodying my invention. Fig. 2 is a perspective view of the shield removed, looking toward the inner side thereof. Fig. 3 is top plan view of the same; and Fig. 4, an enlarged detail perspective view of the rods and fingers or connections, parts being broken away to expose the construction.

Referring now more particularly to the accompanying drawings, the letter A designates a cultivator of the hand type to which my invention in the present instance is shown applied. The shield comprises an attaching member B, having a body portion C, provided with an inwardly-projecting back plate C', formed with a lug or projection c, adapted to fit over upon the side bar A' of the cultivator-frame, and a vertical slot d at its inner end. The said body portion is also provided with a reduced inwardly and forwardly projecting attaching-arm D, adapted to be secured to the cultivator-frame bar by a clip D'. A yoke-clip E is also provided to hold the shield in position, said clip having the ends of its arms e threaded and passed through openings in the body portion of the attaching member and retained by nuts e'.

A connecting-bar F is pivoted on the inner side of the body portion of the attaching member adjacent the slot d and is mounted upon a pivot-bolt g. This bar connects the inner ends of a series of pivotally-arranged shield fingers or rods H, which project through and have vertical movement in the said slot d. The inner ends h of the shield-fingers normally have horizontal disposition and pass through apertures in the connecting-bar, said ends being threaded and engaged by nuts h'. The body portion of the shield-fingers are bowed or curved downwardly and inwardly and outwardly, so as to have position on a plane below the said attaching member, while the outer ends thereof are bent upwardly, so as to prevent them from penetrating into the ground or catching in an obstruction when the device is in operation, and are arranged substantially in line with the inner end of the plate C'. A curved spreader-plate l connects the shield-fingers together at the point of junction of the curved body portion thereof with the horizontal inner ends of the same, said plate being provided in the present instance with openings j for the passage of the fingers therethrough.

The shield is connected with the cultivator A in the manner shown in Fig. 1 and in operation serves to guide or deflect the clods of earth and stones away from the row of growing plants, while readily permitting the soft and fine earth to pass between the fingers thereof around the plants. By reason of the pivotal connection of the connecting-bar F the shield-fingers H are adapted to have vertical movement in the slot d, so as to ride over any obstruction which may be encountered.

My improved shield is adapted for use upon either hand or wheeled cultivators and may be applied on either side thereof, so that it may be employed for shielding a row of plants on either the right or left hand side of the cultivator.

I do not limit my invention to the specific construction and arrangements of parts herein shown, but reserve to myself the right to make such changes and modifications as as clearly fall within the scope of my invention.

A slot d' may be provided upon the upper edge of the attaching-arm D and a similar slot upon the under side of said arm. As will be apparent, by loosening the nuts upon the clip E and placing the clip D' in line with the appropriate slot the finger-carrying end of the attaching member B can be swung upwardly or downwardly upon the clip E as a pivot, the clip D' then being clamped to retain the member B in its raised or lowered position.

The inwardly-bent end of the attaching-plate is provided with a vertical slot $z$, lying in a parallel plane to the slot $d$, which is provided as a convenience in attaching the shield to an ordinary fender-bar on turning or shovel plows.

Having thus described my invention, what I claim as new, and desire to secure by Letters Patent, is—

1. A shield for cultivators, comprising an attaching member provided with a vertical slot in the rear end portion, means for securing said attaching member to a cultivator-frame, a series of spaced ends or fingers bowed outwardly and inwardly, and downwardly and upwardly, forming a compound curve and a bar pivoted to the inner side of said attaching member and connecting the inner ends of said rods, substantially as described.

2. A shield for cultivators comprising an attaching member provided with a forwardly-reduced inwardly-bent end portion notched at $d'$, the rearwardly and inwardly bent end provided with two parallel vertical slots; the fingers H projected through the slot $d$ and connected to the bar F which is pivoted to the plate C, the slot $z$, being adapted to facilitate the attachment of the shield to plows of different make, substantially as described.

In testimony whereof I have signed this specification in the presence of two subscribing witnesses.

THOMAS W. KING.

Witnesses:
EDWARD E. ALLEN,
JOSEPH RAFFENSPERGER.